United States Patent
Stumer

(10) Patent No.: US 6,363,142 B1
(45) Date of Patent: Mar. 26, 2002

(54) NETWORK DIRECTED CALL PICKUP SERVICE

(75) Inventor: Peggy M. Stumer, Boca Raton, FL (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/139,542

(22) Filed: Aug. 25, 1998

(51) Int. Cl.[7] .......................... H04M 3/42; H04M 3/50; H04M 3/54
(52) U.S. Cl. .............................. 379/211.01; 379/211.02; 379/214.01; 379/901
(58) Field of Search .......................... 379/210, 67, 157, 379/201, 207, 209, 211, 212, 214, 67.1, 201.01, 209.01, 211.01, 211.02, 212.01, 214.01, 901; 370/351

(56) References Cited

U.S. PATENT DOCUMENTS

| | | | |
|---|---|---|---|
| 4,603,236 A | | 7/1986 | Smith et al. |
| 4,614,842 A | | 9/1986 | Smith et al. |
| 5,247,670 A | | 9/1993 | Matsunaga |
| 5,309,028 A | * | 5/1994 | Brown et al. ............... 379/201 |
| 5,329,578 A | * | 7/1994 | Brennan et al. ............... 379/67 |
| 5,579,380 A | | 11/1996 | Ferguson et al. |
| 5,610,910 A | * | 3/1997 | Focsanneanu et al. ...... 370/351 |
| 5,815,563 A | * | 9/1998 | Ardon ........................ 379/210 |

* cited by examiner

Primary Examiner—Harry S. Hong

(57) ABSTRACT

A system and apparatus for enabling supplementary service functions, such as directed call pickup, to be implemented in a communications network having more than one server. The multi-server call pickup system is adapted to enable a user to pick up another user's call from a selected destination anywhere within the network, including outside the local server in a multi-server network. The directed call pickup system includes a pickup request unit that is used for initiating the call pickup feature from a specified location in the network. A remote determination unit and a local determination unit to determine whether to establish local or remote connections to a call pickup user may also be provided. A call establishing unit with a negotiation process for connection establishment is provided to establish a connection between the call and the call pickup user. A notification unit may be provided to notify the system of the completed connection. A link release unit may also be provided to release any temporary links used in establishing the connection. A restriction checking unit may be provided as well to ensure that the pickup user is appropriate for picking up the call. An exception handler to enable the appropriate handling of service errors may also be provided.

27 Claims, 10 Drawing Sheets

NETWORK DIRECTED CALL PICKUP SERVICE

BACKGROUND OF THE INVENTION

1. Field of the Invention

The present invention generally relates to a call pickup system and, more particularly, to a network call pickup system for enabling call pickup in a multi-server communication network which allows call pickup of any call by any user connected to any server in the network.

2. Description of the Prior Art

It is well known that modern telephone systems are able to provide a wide variety of convenience features or supplementary services to enhance call convenience and functionality. In particular, call pickup is a supplementary service that may be used, for example, by one user to answer or pickup telephone calls ringing at another station. The call may be ringing, held, camped on, or parked at a different extension. Call pickup is accomplished, generally, by the dialing an access code or depressing a pickup/line key followed by the number of the station to be picked up (e.g., ringing station).

In known private/public telecommunications network/exchange (PTN/PTNX) based networks and client-server based distributed telecommunications networks, telecommunications devices or stations, such as digital telephones, connected to PTN/SERVERS are interconnected by high speed and/or high bandwidth networks. Unfortunately, in such known PTNIPTNX based networks, call pickup is implemented only locally within a single PTN/SERVER, and thus calls may not be picked up by stations that are within the network but connected to another server in the network.

Therefore, what is needed is a system for enabling call pickup from anywhere within a multi-server network regardless of which server the call pickup initiating is connected.

SUMMARY OF THE INVENTION

Briefly, the present invention relates to a system and apparatus for enabling supplementary service functions, such as call pickup, to be implemented in a communications network having more than one server. The multi-server call pickup system is adapted to enable call pick up from anywhere within the network, including calls to users located on a different server within the multi-server network. The call pickup system includes a pickup request unit that is used for initiating the call pickup feature. A remote connect unit and a local connect unit determine the location of the call participants within the network. A call establishing unit having a negotiation process for connection establishment provides a connection between the calling user and the call pickup user. A notification unit notifies the users of the completed connection. A link release unit release any unused linkq in the connection. Optionally, a restriction checking unit may be provided to ensure that the call pickup user is appropriate for picking up the call. An exception handler for enabling the appropriate handling of service errors may also be provided.

BRIEF DESCRIPTION OF THE DRAWINGS

Other features, objects and advantages of the present invention will become readily apparent and understood upon consideration of the following detailed description and attached drawings, wherein.

DETAILED DESCRIPTION OF THE INVENTION

The present invention relates to a system for enabling supplementary telecommunications service functions, and in particular directed call pickup, in a communication network having a plurality of interconnected servers, which enables calls that may be ringing, parked, held or camped-on on any user (i.e., network addressable entity) to be picked up by another user anywhere on the network, including by users located on a different server than the ringing user. Call pickup is initiated, for example, by dialing an access code or depressing a pickup line/key followed by the number of the ringing user.

An important aspect of the invention is that the call pickup system is dependent only on the network architecture and operational environment of the implementor and is Application Program Interface API) and operating service (OS) independent. As will be appreciated by those of ordinary skill in the art, the principles of the present invention are also applicable to a wide variety of different network implementations, and may be used as a feature in any known communications server, including voice services which may span public networks, private networks and interwork between public and private networks, including standard networks such as International Standards Organization (ISO)/European Computer Manufacturers Association for Standardizing Information and Communication Services (ECMA)/European Telecommunications Standards Institute (ETSI)/Private (ISDN) Network Signalling Standard at the "Q" reference point (QSIG) compliant integrated services digital network (ISDN) networks, in a computer supported telecommunication applications/computer telephony interface (CSTA/CTI) network via applications programming interfaces (API) such as Telephony Application Programming Interface (TAPI) and/or a Telephony Services Application Programming Interface (TSAPI) or, as mentioned above, a combination of both ISDN and CSTA/CTI networks.

Another important aspect of the invention is that the multiserver network call pickup service is transparent to all users and, in particular, does not require any special handling on the part of the user picking up the call. Accordingly, the service may use the same interface as local call pickup and may appear to operate in a manner similar to known local call pickup services. Thus, the call pick up system in accordance with the present invention can be seamlessly integrated into an existing local call pickup user interface. As such, since local call pickup services have vendor specific user interfaces, it is not necessary to extend or change the interface for network pickup operation. Another advantage of the call pickup service is the ability to detect and handle network failures, resolve glare/race conditions, and to attempt to prevent calls from being lost during pickup.

Figure 2:
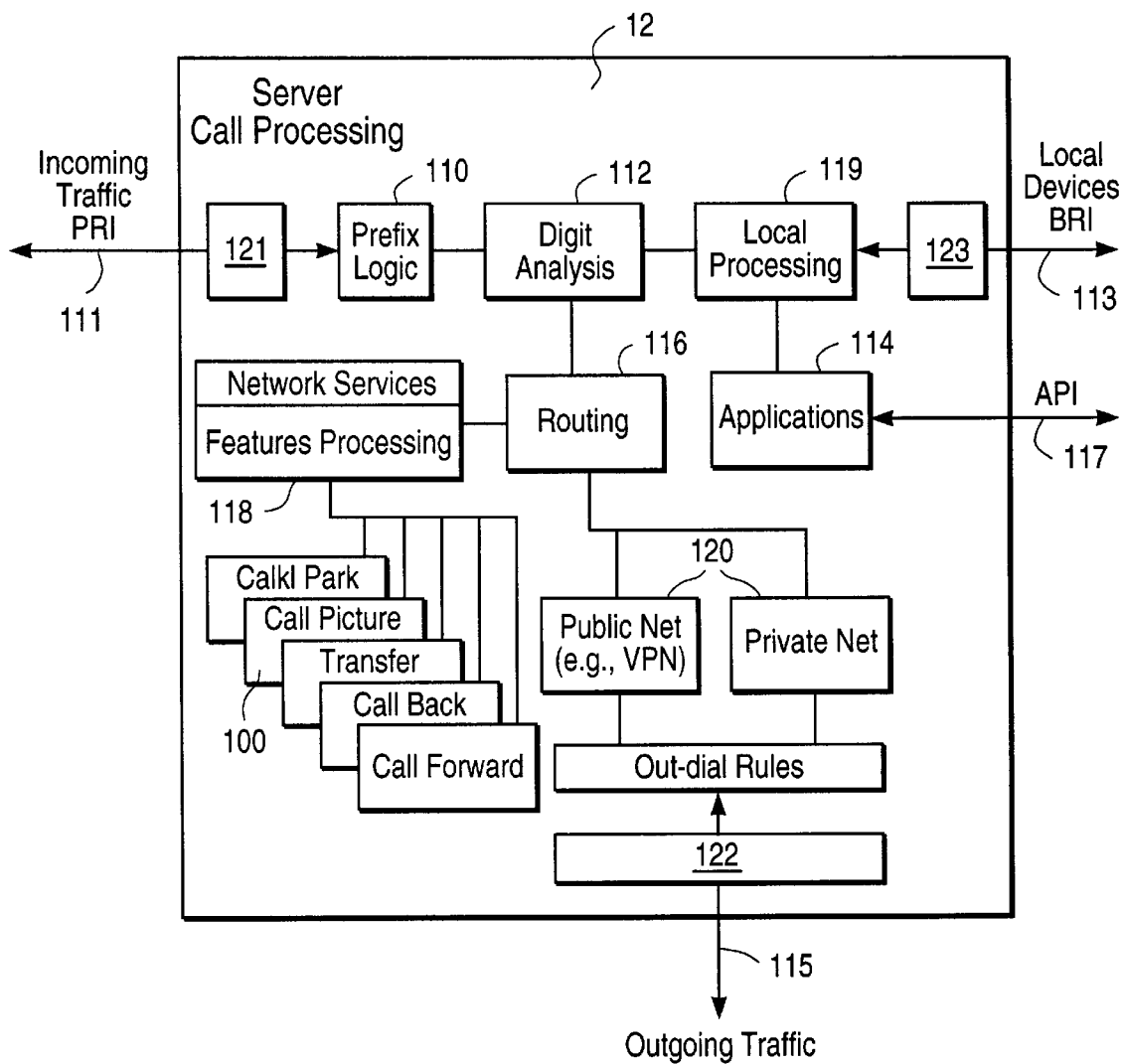
FIG. 2 is a block diagram of a telecommunications server embodying the multi-server call pickup system in accordance with the present invention.
Figure 3:
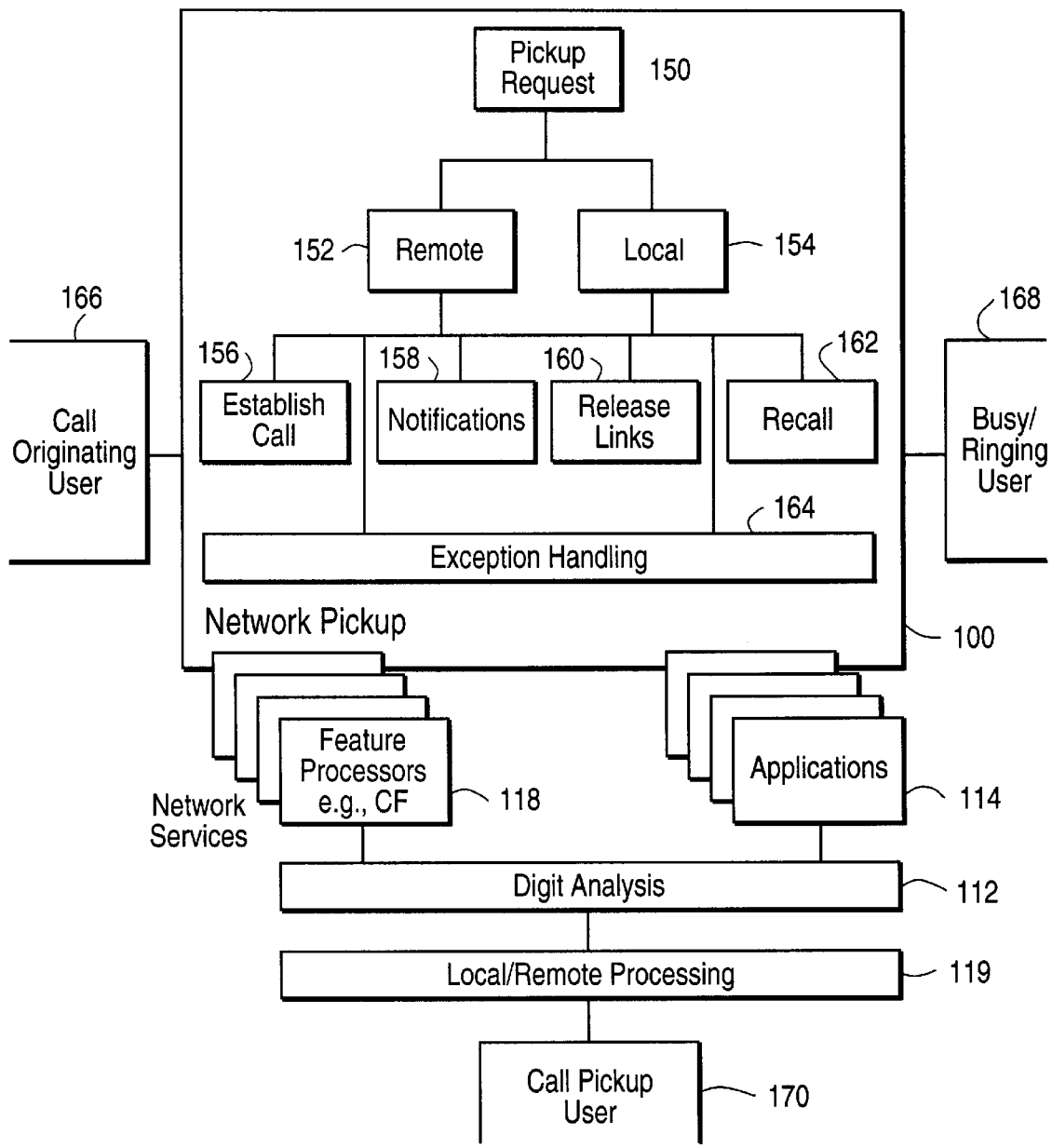
FIG. 3 is a detailed block diagram of the multi-server call pickup system in accordance with the present invention.
Figure 4:
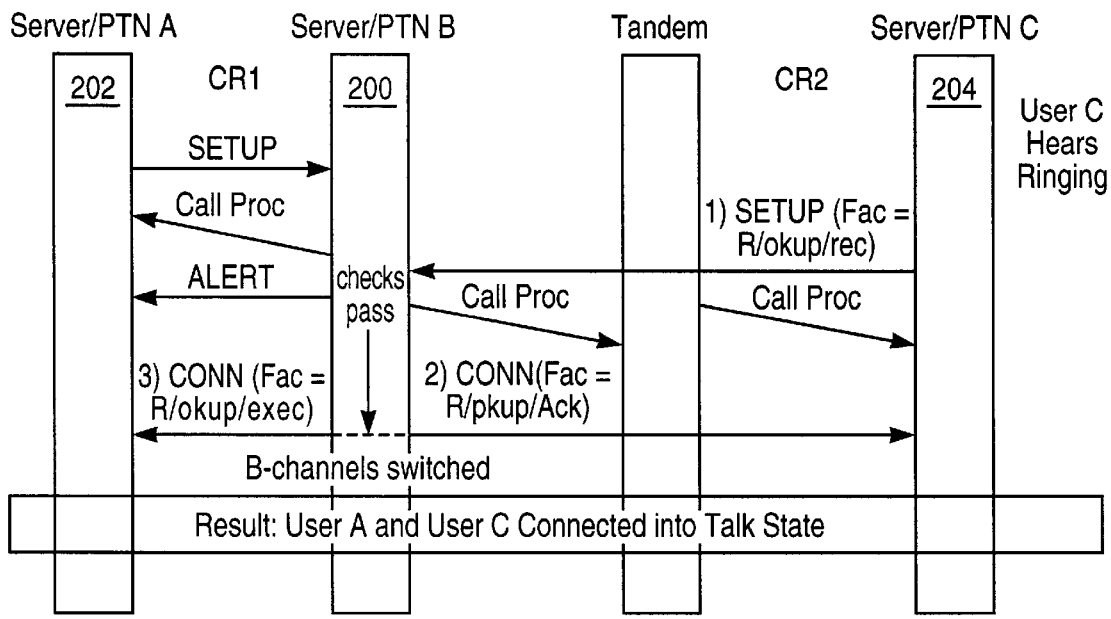
FIG. 4 is a block diagram of a particular embodiment of the multi-server call pickup system illustrating a joining mode of operation.
Figure 5:
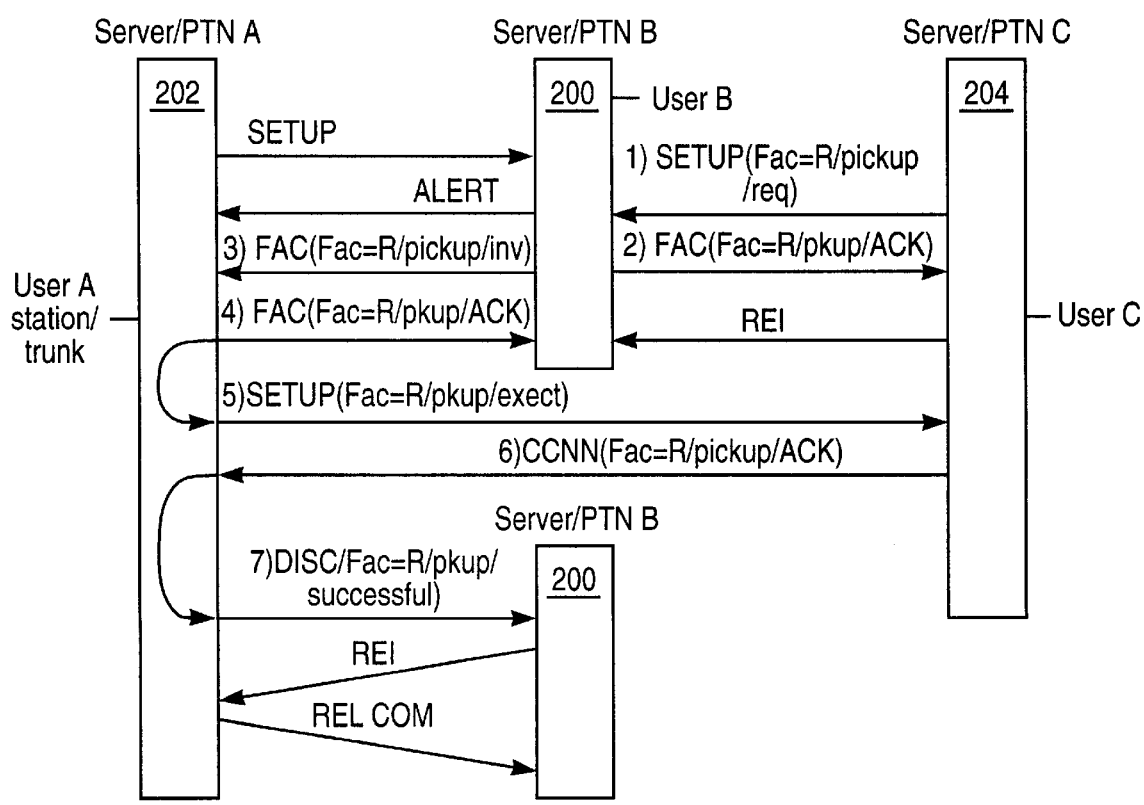
FIG. 5 is a block diagram of a particular embodiment of the multi-server call pickup system illustrating a conservation of links mode of operation.
Figure 6:
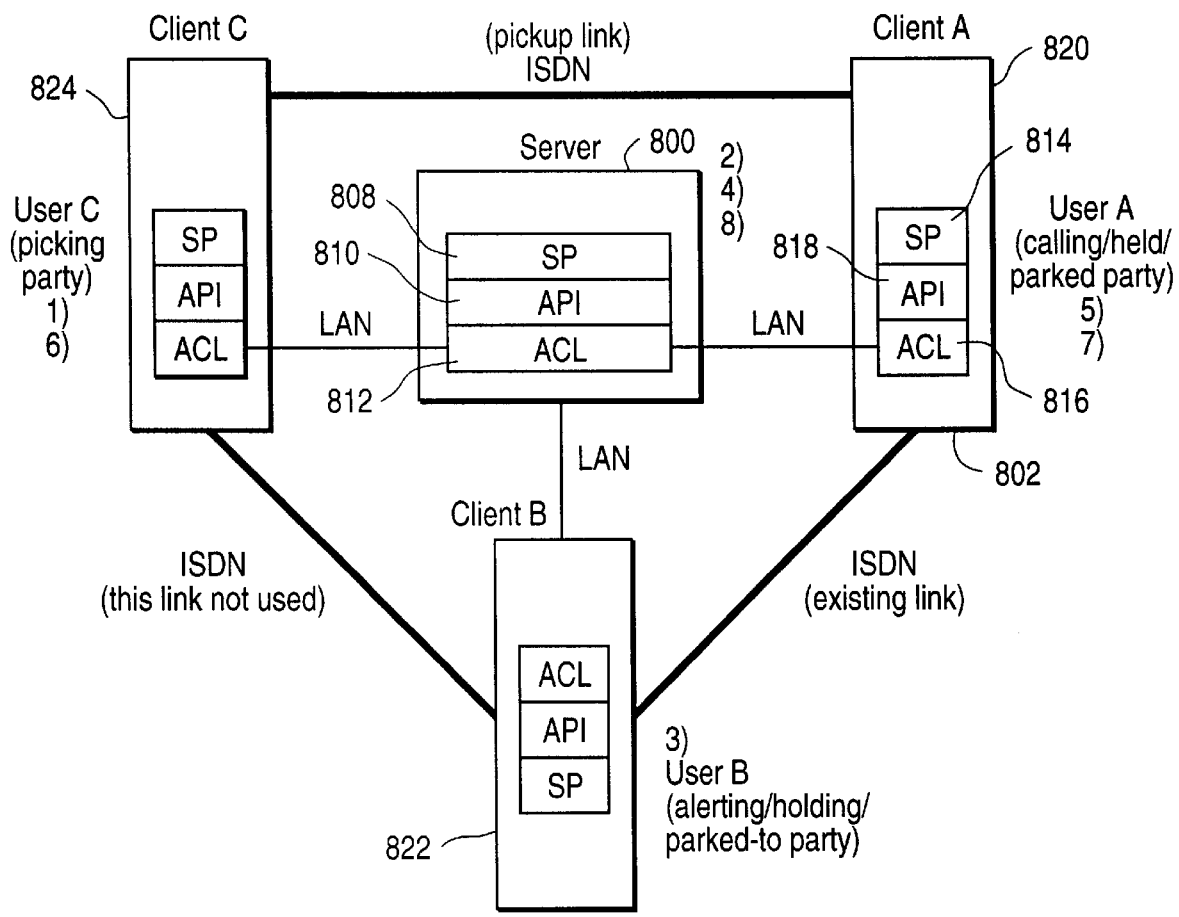
FIG. 6 is a block diagram of a particular embodiment of the multi-server call pickup system illustrating a client/server mode of operation.

Different embodiments of the invention are disclosed. FIGS. 2 and 3 illustrate an exemplary ISDN architecture embodiment. As illustrated in FIG. 4, in an alternate embodiment, the network call pickup service in accordance with the present invention may be used in an ISDN architecture using a joining mode of operation. In another alternate embodiment, as illustrated in FIG. 5, the multi-server network call pickup service in accordance with the present invention may be configured for use in an ISDN architecture using a conservation of links mode of operation. In another alternate embodiment, as illustrated in FIG. 6, the multi-server network call pickup service may be configured for use in a mixed ISDN client/server architecture.

Figure 1:
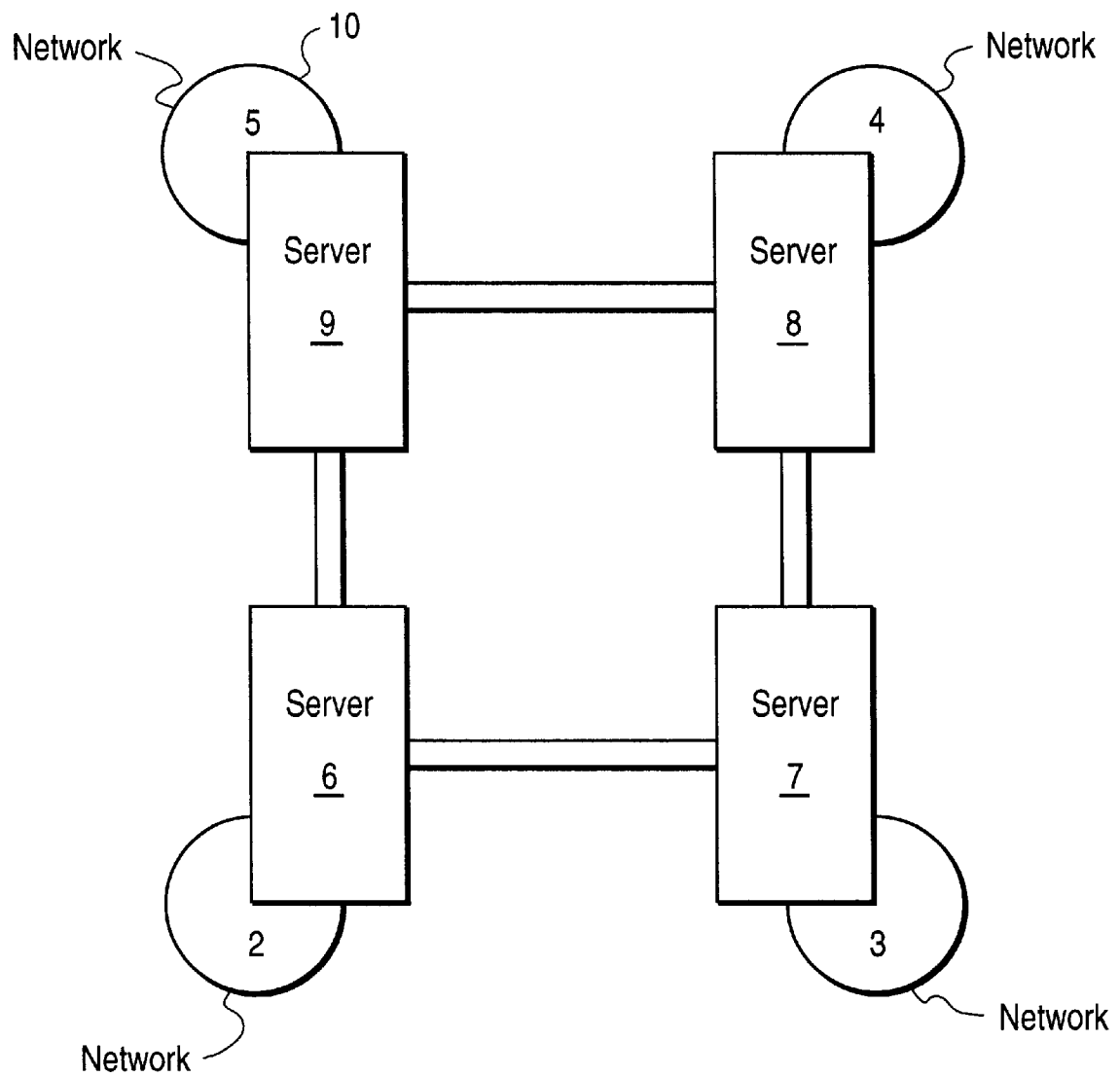
FIG. 1 is a block diagram of a known interconnected telecommunications network.

For a better understanding of the invention, FIG. 1 illustrates a known interconnected network service wherein the entire network includes several interconnected local servers 6, 7, 8, 9 serving local networks 2, 3, 4, 5, respectively. Typically, each local server 6, 7, 8, 9 only controls those supplementary service functions that are local to the network 2, 3, 4, 5. Local servers have heretofore been unknown to control supplementary service functions of other remotely located servers. The present invention provides special functionality to enable local servers to initiate supplementary service functions for execution on remotely located servers.

Referring to FIG. 2, an exemplary embodiment of a network call pickup service in accordance with the present invention for a client server architecture is generally identified with the reference numeral 100. More particularly, the call pickup service 100 is shown implemented, for example, on a communication server 12 as a particular supplementary service in a typical network resources feature processing module 118. The feature processing module 118 may also be used to handle other supplementary services. The communication server 12, which may be any known communications server, such as described in U.S Pat. No. 5,247,670 and hereby incorporated by reference, may include internal standard components, such as prefix logic 110 and digit analysis 112 for receiving, decoding and network address evaluation of dialing plans; applications logic 114, such as CTI, which are described in detail below; a local processing unit 119 for providing user interface aspects of the call pickup system; and a routing unit 116 for routing a completed call to its proper destination.

External interfaces to the server may include an incoming trunk 111, such as a primary rate interface (PRI) or Internet line, incoming local traffic 113, such as basic rate interface (BRI) and outgoing traffic 115, such as interfaces for PRI, virtual public (VPN) and private networks, etc.

An API 117 may be used to connect CTI devices (e.g., using TAPI) to the server 12. The outgoing traffic may be routed, among other methods, over ATM, ISDN and/or Intra/Internet communication networks. Also included is the local processing unit 119 for handling call pickup services within the local server 12, as is done in currently known services.

The incoming/outgoing traffic lines, such as BRI 113 and PRI 111, interface to device/trunk handlers 121, 122, 123. The trunk handlers 121, 122, 123 interface the server 12 with the BRI and/or PRI external interface 111, 113, 115 which contain the signalling channels. In particular, the handlers 121, 122, 123 operate as translation devices and are able to support various protocol types. This is accomplished through either a standard or proprietary message interface between the handlers 121, 122, 123 and the PR and BR interfaces 111, 113, 115. As referred to herein, BRI and PRI may be used interchangeably since the invention generally operates by using the D channel and the associated protocols to receive and transmit messages between communications servers.

For illustration only, D channels are used for all signalling and inter-server communications messages. D channel signalling protocols, known as ISDN User-Network Interface, are specified by the International Telecommunication Union (ITU) Q.930/931 specification. Although some form of signalling data may also be carried by the B channels, by using only the D channels for signalling, the B channels generally remain free to carry communications data, speech or a combination thereof.

Referring to FIG. 3, the call pickup service 100 is shown in greater detail. As mentioned above, the call pickup service 100 is responsible for enabling incoming calls to a call recipient to be picked up by any user or application from anywhere within the network. Call pickup may generally be invoked by obtaining a dial tone or similar idle condition, pressing a pickup function key (or other means) and dialing the network address, such as a phone extension, of where the party to be picked up is located. It should be noted that in the present invention, the user picking up the call may be located within the multi-server network but connected to a server other than that from which the call is to be picked up. Furthermore, call pickup may be initiated from the idle state or other state, such as the talk state (consultation) and from a conference, held, parked, camped-on and/or transferred state.

The call pickup service 100 includes a pickup request unit 150 that is used for initiating the call pickup feature. A remote determination unit 152 and a local determination unit 154 represent whether local or remote processing is required based on the location of the user to be picked up (e.g., ringing user). A call establishing unit 156 is provided to establish a connection between the originating call and the call pickup user if the users are located on different servers or remote from each other. A notification unit 158 notifies the users of the completed connection. A link release unit 160 releases any unused links in the connection. A restriction checking unit 162 determines whether the user picking up the call is authorized to do so. For example, a particular user station may not be equipped to handle particular calls or the user may not be authorized by the system/network administrator to pickup calls. In such instances, the restricted user will not be allowed to pickup the call based on the determination of the restriction checking unit 162. An exception handler 164 to enable the appropriate handling of service errors may also be provided.

In operation, a user 170, who may be local or remote to the user 168, may invoke the call pickup service, for example, by depressing a pickup key/line and entering the digits of the ringing/busy user 168 where a user 166 originating the call that is to be picked up is waiting. The call originating user 166 may be in one of several possible states such as ringing state, held state, camped-on state, etc. The server 12 processes the input request in the local processing unit 119, analyzes the digits using the digit analysis unit 112 and calls the network pickup service 100. Processing at the remote connect unit 152 or the local connect unit 54 occurs depending on if the number dialed (that of user 168) resides in the local server or a remote server in the network.

When the destination is remote, a call request message is sent to the destination user 168 who may be held, busy or ringing. In particular, the call establishing unit 156 establishes a call to the held/destination user 168. A setup message, which includes a pickup request generated by the pickup request unit 150, is then sent to the destination user 168. The message is supervised by the call pickup system 100 for a return response. If the response is negative, such as may occur if the restriction checking unit 162 disallows the call pickup user 170 from connecting with the destination user 168 (or user 166), then the call pickup user 170 is denied the call. The server of the destination user 168 may also return a negative response when another user has picked up the call first, such as when a race condition occurs. If the response is positive, the pickup service is considered successful and the two users are switched together.

When the call pickup user 170 and the call originating user 166 are connected and local to each other, which can be determined using known methods, then the link release unit 160 will clear all parallel network type links after first connecting the two users' timeslots internally.

In either a local or remote situation, as described above, successful network directed call pickup results in the call originating user 166 and the call pickup user 170 connecting into talk state. In the case of some type of failure condition, the exception handler 164 may be used to for handling any error or abnormal conditions that are detected, such as network congestion, vacant number, no route to destination, etc. The notification unit 158 may be used to generate a notice for signalling success or failure of the call pickup attempt. For example, if the call pickup was successful, the name and number of the call pickup user 170 may be shown on a display on the call originating user's 166 device. If the call pickup was unsuccessful, the call pickup user 170 may receive a reorder tone, a "not possible" display or some other indication of failed call pickup. In any case, a successful result or an unsuccessful result leads to an end of processing of the network call pickup service.

Figure 7:
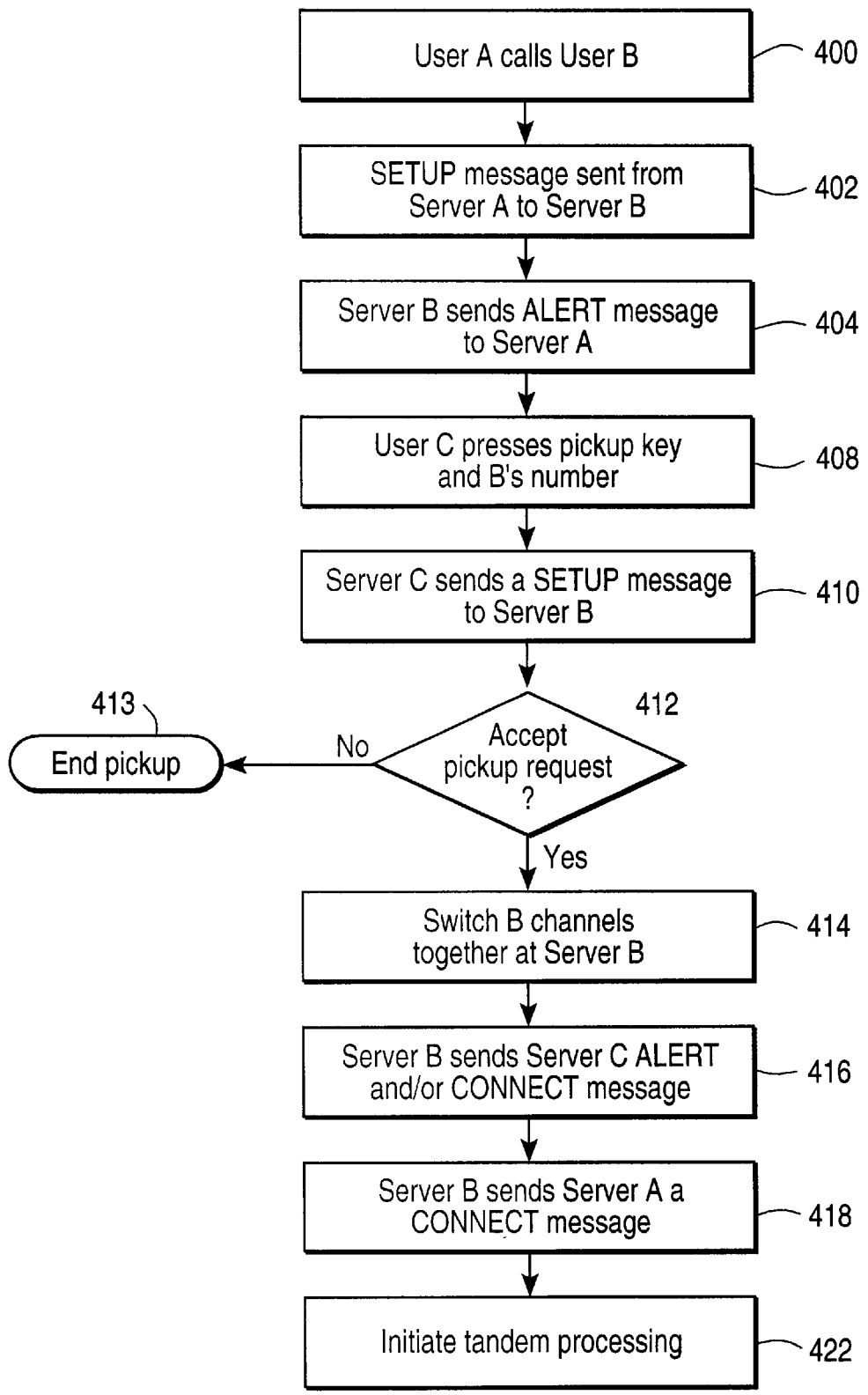
FIG. 7 is a flow diagram of the multi-server call pickup system in a joining mode of operation.

Referring to FIGS. 4 and 7, an exemplary call pickup system is shown depicting a successful network pickup operation in joining mode. In particular, the system is shown implemented in an ISDN architecture in a joining mode wherein the system retains a connection between the call originating user 166, the destination user 168 and the call pickup user 170. It should be noted that the sequence numbers in FIG. 4 (e.g. "1)" indicate the order of the steps in which ISDN messages are transmitted and the arrows indicate where the ISDN messages originate and terminate and in which direction the messages are traveling. It should further be noted that references to "facility" notification and messages, as used in the present invention, implies, but is not limited to, the industry standard ITU Q.932 facility information element (FIE) with remote operations service elements (ROSE) encoding. In addition, each FIE is assigned a particular value depending upon the functions being performed. ISDN protocols require that each link of a call be assigned a call reference value. For example, as shown, connections between the server A 202 and the server B 200 have a call reference value of CR1. The call reference values are used by ISDN messages to specify the connections at which the commands are to be executed.

Referring to FIG. 7, in step 400, the call pickup system is activated through the pickup request unit 152 (FIG. 3). In step 402, a SETUP message is sent from the party which is picked up to the user device at which the picked up call was ringing or held. In particular, an ISDN SETUP message is sent from the call originating user 166 (FIG. 3) to the destination user 168 (FIG. 3). In step 404, the server B 200 sends an ALERT message to the server A 202 to indicate, for example, that the destination user 168 is alerting (ringing) and, accordingly, the call originating user 166 hears a ring back tone. In step 408, the user 170, for example, hearing the user 168 device ringing, attempts a network directed call pickup of the call originating user 166 at the destination user 168 device by pressing a pickup line/key followed by the number of the destination user 168.

To effect call pickup, in step 410, the server C 204 sends a SETUP message with request for remote call pickup services and establishes a B channel for the subsequent connection. The setup message includes a FIE having the value of remote call pickup request. In step 412, the server B 200 receives the SETUP message with pickup service request and decides whether the pickup should be allowed, based on the results of restriction and authorization checks. The pickup service for this pickup attempt ends in step 413, if the destination user 168 rejects the pickup request. In step 414, if the destination user 168 allows the call pickup, the server B 200 switches the B channels together. This results in the bearer channel of the call pickup user 170 and the call originating user 166 forming an end to end ISDN connection between the server C 204 to the server B 200 and the server B 200 to the server A 202, including any intermediate links involved in the connection. In step 416, the server B 200 sends the server C 204 an ALERT and/or CONNECT message with acknowledgement/confirmation of the remote pickup. In step 418, the server B 200 sends the server A 202 a CONNECT message with indication of network call pickup. In this particular example, the call has not yet been answered. In the case where the call already was answered (e.g., in held state) a NOTIFY message is sent rather than a CONNECT message. In both cases, a FIE is sent to notify user 166 of the call pickup. Optionally, the user 170 name and number may also be sent. In step 422, the server B 200 initiates tandem processing (i.e., the server B 200 transitions from a network terminating state to a network tandem state).

Figure 8A:
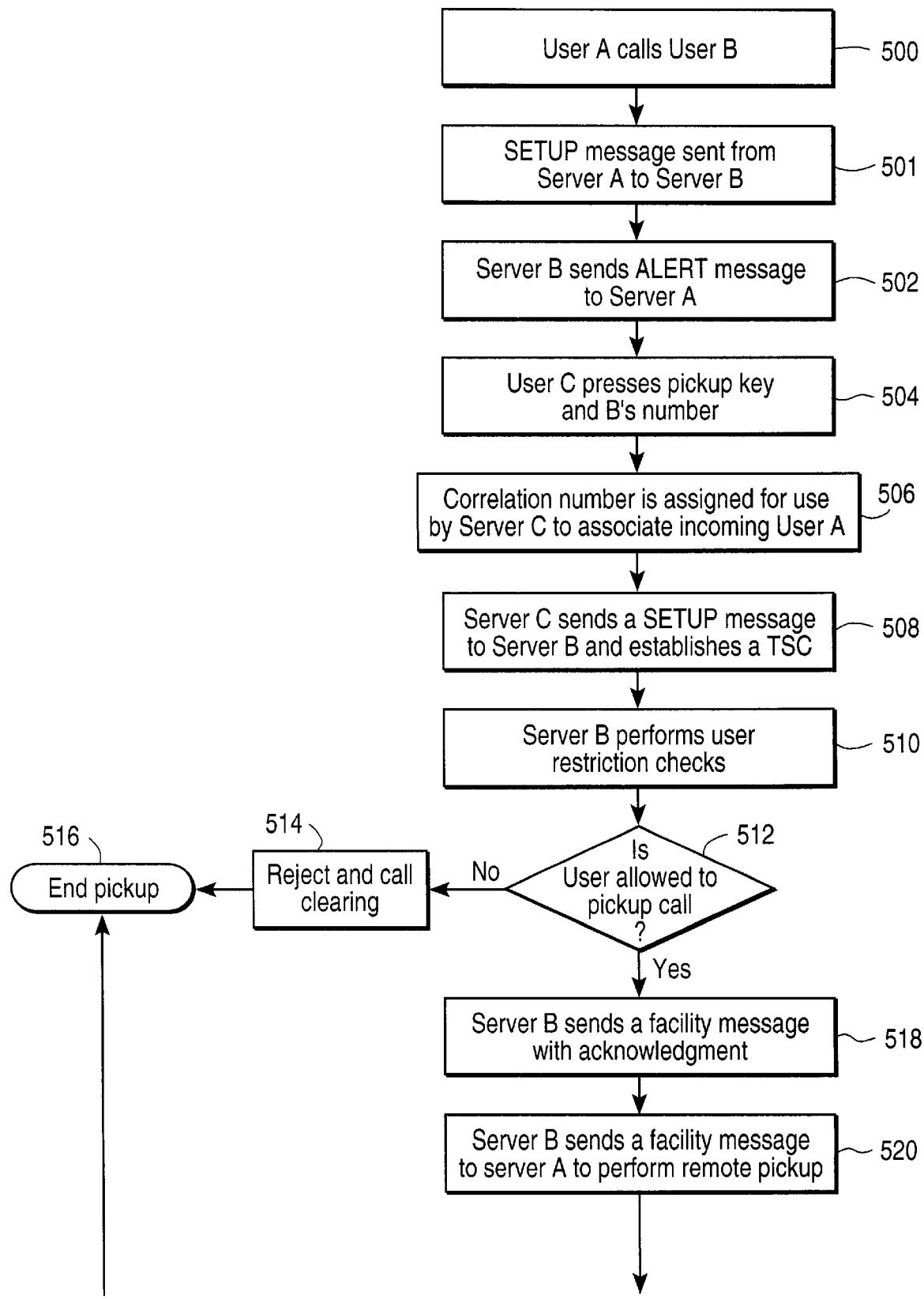
FIGS. 8A and 8B are flow diagrams of the multi-server call pickup system in a conservation of links mode of operation.
Figure 8B:
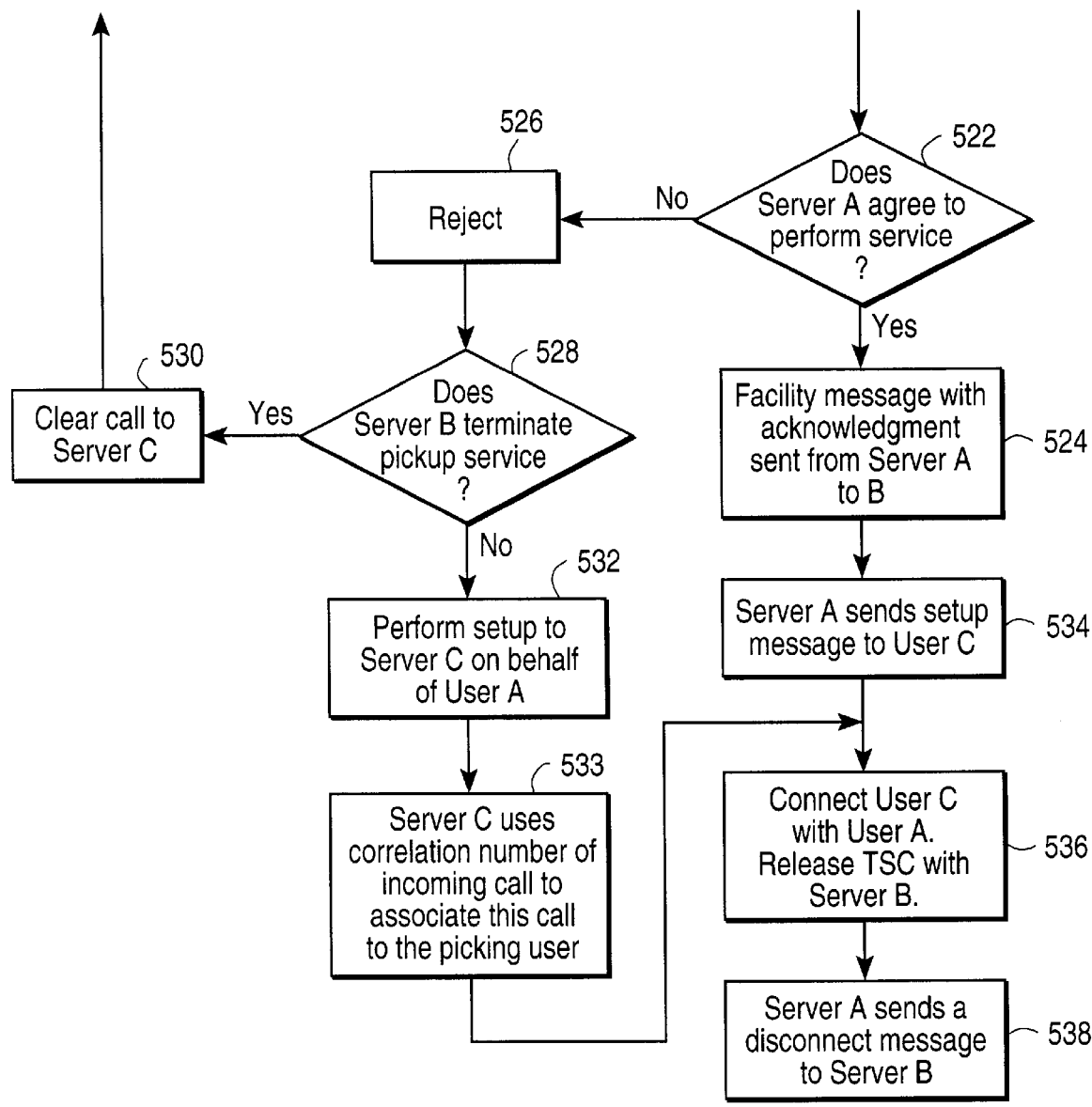

Referring to FIGS. 5, 8A and 8B, exemplary operation of the call pickup service is shown implemented in an ISDN architecture in a conservation of links procedure wherein the fewest number of links possible between the call originating user 166, the destination user 168 and the call pickup user 170 are used prior to connect. Such a procedure enables conservation of links by releasing one or more unused links between the users when possible. As described above, the sequence numbers in FIG. 5, (e.g., "1)" indicates the order of the steps in which the ISDN messages are transmitted.

In step 500, the call originating user 166 calls the destination user 168 and a SETUP message is sent from the server A 202 to the server B 200 in step 501. In step 502, the server B 200 sends an ALERT message to the server A 202 to indicate, for example, that the destination user 168 is alerting. Accordingly, the call originating user 166 hears a ringback tone. In step 504, the call pickup user 170, hearing the ringing user 168 ringing, attempts a directed call pickup of the call originating user 166 at the destination user 168 by pressing a pickup line/key followed by the number of the destination user 168. In step 506, a network wide unique correlation number is used to associate the call at the call originating user 166 with the destination user 168 and to switch the connections together.

The implementor may determine whether the server C 204 or the server B 200 assigns this correlation number. If the server B 200 assigns the number, then it is included in the facility acknowledgement to the destination user 168 and sent to the call originating user 166 in the facility request for remote direct pickup. However, if the server C 204 assigns the number, then it is sent to the server B 200 in the SETUP message with the service request for remote pickup. The server B 200 then sends the number to the server A 202 in the FACILITY message with remote pickup service request. The server A 202 must include the number in its service request for execution in the SETUP message to the call pickup user 170, thereby ensuring that the correct users are connected by the server C 204. In step 508, the server C 204 sends a SETUP message with service request for remote call pickup without establishing a B channel. Thus, only a temporary signalling connection (TSC) is used. In step 510, the server B 200 performs any user restriction checks and determines in step 512 if the call pickup user 170 is allowed to pickup the call. In step 514, if the server B 200 rejects the pickup request, the TSC will be cleared and the pickup service will end in step 516.

When allowed, in step 518, the server B 200 sends a FACILITY message with acknowledgement. The FACILITY message includes a FIE facility return positive acknowledgement in response to the request directed call pickup message. The server B 200, in step 520, sends a FACILITY message with an invite remote directed call pickup to the server A 202 to establish the new connection to the server C 204. The assigned correlation number is also included, as well as the network address/number of the user picking up the call. In step 522, the server A 202, upon receiving the facility request, determines whether to perform the remote directed pickup. If the server A 202 decides to perform the call pickup, then a facility message with acknowledgement is sent back to the server B 200 in step 524. If the server A 202 decides not to perform the remote pickup in step 526, a facility reject (with cause value of facility not supported) is sent to the server B 200 in step 528. In step 528, when the server B 200 receives the reject return response from the server A 202, the server B 200 may determine its action to take based on the cause reason provided. That action may include clearing the TSC in the server C 204 in step 530 or, alternatively, sending a setup message to the server C 204 on behalf of the server A 202 with the FIE remote pickup execution and correlation number in step 532. In step 534, when agreeing to attempt the remote pickup service, the server A 202 sends a SETUP message using B channel to the call pickup user 170 with the remote pickup execution including the correlation number. When a call proceeding message is received, the server A 202 will switch the B channel of the destination user 168 to the B channel of the call pickup user 170.

In step 533, the server C 204 receives the incoming SETUP message with remote pickup execution and is able to identify the correlation number with the call pickup user 170 correlation number. In step 536, the server C 204 connects the call pickup user 170 with the call originating user 166. It should be noted that the server C 204 must not provide ringback tone or busy tone in the B-channel, but should transition the two users into active state. The server C 204 sends a CONNECT message with acknowledgement to the server A 202 and the server C 204 clears the TSC to the server B 200. In step 538, the server A 202, upon receiving the CONNECT message with acknowledgement, sends a DISCONNECT message to the server B 200 with facility indication that the remote pickup was successful.

Exception conditions, for example, when there is no route to destination, all circuits busy, etc., result in the server A 202 sending the server B 200 a FACILITY message with remote pickup unsuccessful. In this case, the server B 200 sends the server C 204 a RELEASE message with remote pickup unsuccessful. Alternatively, the server B 200 may decide to establish the call to the server C 204 on behalf of server A 202. In such a case, the system returns to step 526.

Referring now to FIG. 6, an embodiment of the directed call pickup service in a mixed ISDN/CSTA/CTI solution is shown wherein a server may act as 3rd party services or group services in a centralized control point. The call pickup service, as will be discussed in more detail below, includes a generic server (GS) 800 and one or more PTN/Servers 802, 824, 822. The GS 800 is connected to each of the PTN/Servers 802, 824, 822 either directly through high bandwidth/CTI links or via tandem PTN/X/Servers (not shown). The GS 800 includes functions such as a service processor (SP) 808, an API 810 and an application control link (ACL) 812 for link control. Similarly, the PTN/Servers may include their own SP 814, ACL 816 and API 818. The generic server ACL 816 connects to the PTN/Server ACL 812 to complete the connection, thereby enabling generic server-to-PTN/Server communication.

In a second interface, each of the PTN/Servers is interconnected via ISDN lines. Thus, the mixed ISDN/CSTA/CTI based embodiment of the present invention enables a client to pick up a call intended for another client via a physical ISDN connection between, for example, a Client A 820 and a Client C 824 enables the client to pick up a call to the GS 800 via a logical connection between the Client A 820 and the GS 800. Because of the mixed environment, much of the signalling found in an ISDN only solution is performed by the servers and their respective service processors, thereby substantially reducing the amount of ISDN D channel signalling and conserving ISDN links in the network. Furthermore, as a client invocation option, when picking up a call from another client, the present invention may be invoked without establishing a B channel connection. In such instances, a TSC is established.

As discussed above, and referring to FIGS. 6, 9A and 9B, the call pickup service is shown in an exemplary ISDN/CSTA/CTI mode of operation wherein the service enables the client to pick up a call from another client. It should be noted that many of the signalling messages flow along the LAN interface connections and other signals flow through the ISDN connections, as described below. Furthermore, correlation numbers are provided as network-wide unique transaction identifiers. The correlation numbers are necessary for the GS 800 and each server to correlate each of the transactions to one call. Alternatively, call IDs and/or device IDs may be used to identify the call. To ensure uniqueness, the GS 800 should assign the correlation number or modify a received correlation number to make it unique. For example, a correlation number may be assigned by the server C 204.

Figure 9A:
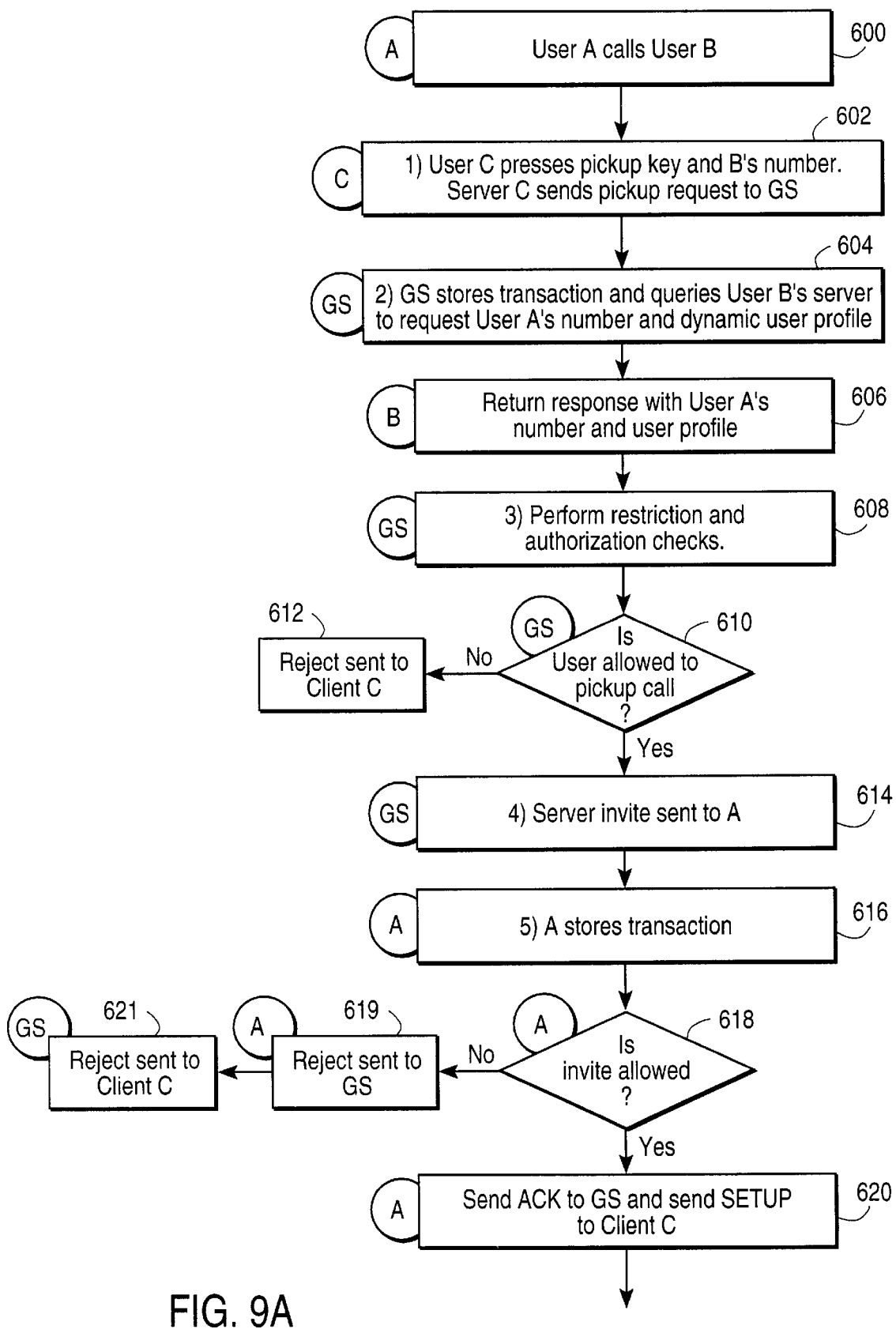
FIGS. 9A and 9B are flow diagrams of the multi-server call pickup system in a client/server mode of operation.
Figure 9B:
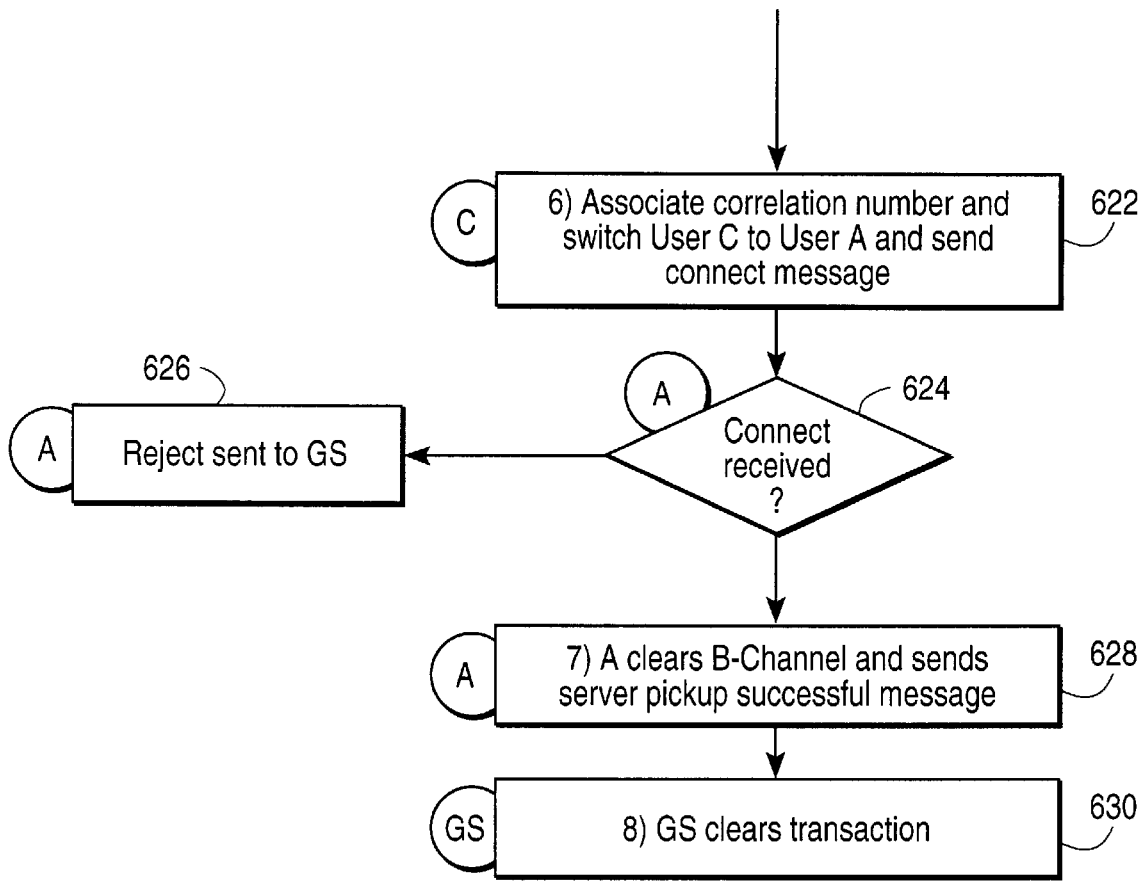

Note that in FIGS. 9A and 9B, the activity being performed for each particular function is indicated by a number that corresponds to the number shown in FIG. 6 (i.e., "1)"). In addition, the server performing each particular function is indicated in an attached circle next to each flowchart box. As illustrated in FIGS. 9A and 9B, during a call from the Client A 820 to the Client B 822 in step 600, the user at the Client C 824 invokes the call pickup service by, for example, pressing a pickup line/key and entering the number for the Client B 820 in step 602. In particular, a REDIRECT message having pickup request, Client B's number, Client C's number and profile and a correlation number is sent from the Client C 824 to the GS 800. Optionally, a negotiation procedure (not shown) may be included in the pickup request whereby Client C's server and the GS 800 determine whether Client A's server or Client C's server executes setup establishment to the other, and, if that setup establishment is unsuccessful, whether to reverse the setup establishment to retry in the other direction.

The setup establishment could be performed by: 1) the server of the party to-be-picked up, i.e., the server A to the server C; 2) the server of the user picking up the call, i.e., the server C to the server A; or 3) the server where the call is alerting, held parked, etc., i.e. the server B to the server C via joining the two connections at the server B. An administration process may indicate in the GS 800 database (not shown) which server is capable/allowed to perform the setup establishment and request that particular server to attempt the setup. If the setup establishment fails, the GS 800 could request one of the other two servers to attempt the setup establishment. The administered setup establishment preference may depend on customer/client billing requirements. Alternatively, a negotiation process may be used between the GS 800 and the server of the user picking up the call and the user to-be-picked up. The negotiation process involves the client C's server sending its capability (e.g. can setup/cannot setup) in the pickup request to the GS 800. Upon receipt, the GS 800 can determine what action to take, such as, for example, requesting one of the servers to attempt the setup establishment based on dynamic or static capabilities.

In step 604, the GS 800 receives the request and stores the transaction by correlation number with Client C's profile. The GS 800 sends a QUERY message to Client B's server to request Client A's number. in step 606 Client B 822 informs the GS 800 of Client A 820 by sending the GS 800 a QUERY response message having the values acknowledge and Client A's number and profile. Upon receipt, the GS 800 in step 608 may perform authorization and restriction checks to allow or deny Client C's pickup service request. In step 610, if the service request is denied, the call may not be picked up and in step 612 a REDIRECT response message is sent from the GS 800 to the Client C 824 having the values of pickup reject, correlation number and cause.

However, if it is determined in step 610 that the call may be picked up, then in step 614, the GS 800 sends an invite request to the Client A 820 in a REDIRECT message having the values pickup invite request, Client C's number and profile and the correlation number. Upon receipt of the invite, the Client A 820, in step 616, stores the transaction by correlation number and can either agree or disagree in step 618 to attempt the redirection by sending positive or negative acknowledgement to the GS 800. In the case of agreement, a SETUP message is sent to the Client C 824 with a correlation number in step 620. In particular, a REDIRECT message having the values of pickup invite acknowledge, Client A's number and profile and the correlation number is sent from the Client A 820 to the GS 800. In addition, ISDN message of SETUP having the values of called=Client C's number and FACILITY having the value of redirect/pickup/executed, Client A's number and profile and the correlation number is sent from the Client A 820 to the Client C 824. This establishes an ISDN B-channel between the Client A 820 and the Client C 824 and B-channel is cut-through upon receipt of a call proceeding message. Cut through, which may also be referred to as switching from one circuit to another, as used herein, is the act of connecting one circuit to another, resulting in a two-way or multi-way connection.

However, the Client A 820 may reject the invite in step 618. Accordingly, then in step 619, a REDIRECT response message from the Client A 820 to the GS 800 may be sent having the values pickup invite reject, correlation number and cause. In step 621, a REDIRECT response (pickup reject) is sent to the Client C 824 by the GS 800.

In step 622, the Client C 824 receives the SETUP message and associates the correlation number, switches the Client C 824 to the Client A 820 and sends a CONNECT message to the Client A. In particular, an ISDN message of CONNECT having the values of facility=redirect/pickup/acknowledge, Client C's number and profile and correlation number is sent from the Client C 824 to the Client A 820.

If, in step 624, the CONNECT message is not received or if a guard timer (not shown) expires, then in step 626 a REDIRECT response message is sent from the Client A 820 to the GS 800 having the values of pickup reject, correlation number and cause. In step 628, upon receipt of the CONNECT message, the Client A 820 clears the B-channel to the Client B 822, indicating the call was picked up, and sends the server GS 800 indication of the pickup success. In particular, an ISDN DISCONNECT message is sent from the Client A 820 to the Client B 822 having the value of facility=redirect/pickuplacknowledge, Client C's number and profile and the correlation number. A REDIRECT message is also sent from the Client A 820 to the GS 800 having the value of pickup successful and the correlation number. In step 630, the GS 800 receives the message from the Client A 820 and clears the transaction.

What is claimed is:

1. A call pickup system for a communication network having a plurality of servers, comprising:
    a pickup request unit configured to activate a call pickup of any user including users located on different servers within the network, wherein said different servers service different private networks, wherein said call pickup comprises a call pick up user picking up on a first station a call directed to a second station; and
    one or more call establishing units configured to establish a connection between a call pickup user and a call originating user responsive to said pickup request unit activating said call pickup, wherein said call pick up and call originating users can be connected to different servers on the network.

2. The system as recited in claim 1, wherein said one or more call establishing units may include a local connect unit configured to connect a call pickup user to a call originating user wherein said call pickup user and said call originating user are located on the same server within the network.

3. The system as recited in claim 1, further including one or more determination units configured to determine which server said call pickup user and said call originating user are resident.

4. The system as recited in claim 3, wherein said determination unit is a remote determination unit adapted to determine whether said call pickup user is remote from said call originating user.

5. The system as recited in claim 3, wherein said determination unit is a local determination unit adapted to determine whether said call pickup user is local to said call originating user.

6. The system as recited in claim 1, further including a link release unit configured to release unused connections established by the all pickup system.

7. The system as recited in claim 1, further including one or more restriction checking units configured to control whether said connect units may be allowed to establish a connection between the call pickup user and the call originating user.

8. The system as recited in claim 1, further including a notification unit adapted to signal whether said connect units were able to successfully establish a connection between said call pickup user and said call originating user.

9. The system as recited in claim 1, further including an exception handling unit configured to handle errors when said one or more connect units fail to establish a connection between said call pickup user and said call originating user.

10. A method for establishing a connection between a call originating user and a call pickup user in a communication network having one or more servers including one or more generic servers, wherein said different servers service different private networks, comprising:

invoking a call pickup procedure for enabling the call pickup user to pickup up the originating user in response to a signalling negotiation process from said originating user or said generic server, wherein said call pickup comprises a call pick up user picking up on a first station a call directed to a second station; and establishing a connection between the call pickup user and the call originating user.

11. The method as recited in claim 10, further including the step of determining whether the call originating user and the call pickup user are resident on the same server in the communication network.

12. The method as recited in claim 10, further including the step of determining whether the call originating user and the call pickup user are resident on different servers in the communication network.

13. The method as recited in claim 10, further including the step of releasing unused connections established by the connection establishing step.

14. The method as recited in claim 10, further including the step of checking and controlling whether said establishing step established a connection between the call pickup user and the call originating user.

15. The method as recited in claim 10, further including the step of signalling whether said establishing step established a connection between the call pickup user and the call originating user.

16. The method as recited in claim 10, further including the step of handling errors when said establishing step fails to establish a connection from the call originating user to the call pickup user.

17. The method as recited in claim 16, further including the step of establishing a connection from the call pickup user to the call originating user when said connection establishment has failed.

18. The method as recited in claim 17, further including the step of negotiating to determine how to establish said connection.

19. The method as recited in claim 17, wherein said connection may be established by one or more users.

20. The method as recited in claim 19, wherein said connection may be established by said call originating user.

21. The method as recited in claim 19, wherein said connection may be established by said call pickup user.

22. The method as recited in claim 19, wherein said connection may be established by a destination user.

23. A call pickup system for a communication network having a plurality of servers, wherein said different servers service different private networks, comprising:

means for activating a call pickup of any user including users located on different servers within the network, wherein said call pickup comprises a call pick up user picking up on a first station a call directed to a second station; and means responsive to said activating means for establishing a connection between a call pickup user and a call originating user, wherein said call pick up and call originating users can be connected to different servers on the network.

24. The system as recited in claim 23, further including means for releasing unused connections established by the call pickup system.

25. The system as recited in claim 23, further including one or more means for controlling whether said connection establishing means may be allowed to establish a connection between the call pickup user and the call originating user.

26. The system as recited in claim 23, further including means for signalling whether said connect units were able to successfully establish a connection between said call pickup user and said call originating user.

27. The system as recited in claim 23, further including means for handling errors when said one or more connection establishing means fail to establish a connection between said call pickup user and said call originating user.

* * * * *